United States Patent
Sabelström

(10) Patent No.: US 8,131,431 B2
(45) Date of Patent: Mar. 6, 2012

(54) METHOD FOR CONTROLLING COOLING OF AN AUXILIARY BRAKE

(75) Inventor: Mats Sabelström, Billdal (SE)

(73) Assignee: Volvo Lastvagnar AB, Göteborg (SE)

( * ) Notice: Subject to any disclaimer, the term of this patent is extended or adjusted under 35 U.S.C. 154(b) by 332 days.

(21) Appl. No.: 12/518,914

(22) PCT Filed: Jan. 18, 2008

(86) PCT No.: PCT/SE2008/000041
§ 371 (c)(1), (2), (4) Date: Jun. 12, 2009

(87) PCT Pub. No.: WO2008/091193
PCT Pub. Date: Jul. 31, 2008

(65) Prior Publication Data
US 2010/0082205 A1  Apr. 1, 2010

(30) Foreign Application Priority Data
Jan. 23, 2007  (SE) ....................... 0700174

(51) Int. Cl.
*G06F 17/30* (2006.01)
(52) U.S. Cl. ....................................... 701/48
(58) Field of Classification Search ............ 701/36, 701/48; 180/71.6
See application file for complete search history.

(56) References Cited

U.S. PATENT DOCUMENTS

| | | | |
|---|---|---|---|
| 5,003,483 A * | 3/1991 | Hedstrom | 701/93 |
| 5,847,644 A * | 12/1998 | Weisman et al. | 340/439 |
| 6,026,784 A | 2/2000 | Weisman et al. | |
| 6,067,489 A * | 5/2000 | Letang et al. | 701/36 |
| 6,546,899 B1 | 4/2003 | Friedrich et al. | |
| 6,625,535 B2 * | 9/2003 | Han et al. | 701/65 |
| 7,152,935 B2 * | 12/2006 | Kinder et al. | 303/191 |
| 7,308,352 B2 * | 12/2007 | Wang et al. | 701/70 |
| 2006/0207842 A1 * | 9/2006 | Strandberg | 188/264 D |
| 2009/0164084 A1 * | 6/2009 | Hawkins et al. | 701/102 |
| 2009/0210125 A1 * | 8/2009 | Dessirier | 701/70 |

FOREIGN PATENT DOCUMENTS
DE 19641558 A1 4/1998
WO 0247948 A1 6/2002

OTHER PUBLICATIONS

International Search Report for corresponding International Applitation PCT/SE2008/000041.
International Preliminary Report on Patentability for corresponding International Application PCT/SE2008/000041.

* cited by examiner

*Primary Examiner* — Paul N Dickson
*Assistant Examiner* — Nicole Verley
(74) *Attorney, Agent, or Firm* — WRB-IP LLP

(57) ABSTRACT

In a method for controlling cooling of an auxiliary brake on a vehicle, the auxiliary brake is cooled by a cooling member. The method comprises the steps of: determining if the vehicle is travelling down a slope or is to be driven down a slope, and activating the cooling member automatically for cooling the auxiliary brake provided that at least one predefined downhill slope condition is determined.

21 Claims, 2 Drawing Sheets

METHOD FOR CONTROLLING COOLING OF AN AUXILIARY BRAKE

BACKGROUND AND SUMMARY

The present invention relates to a method for controlling cooling of an auxiliary brake, such as a hydraulic retarder.

It is known to arrange auxiliary brakes in a vehicle as a complement to the service brakes of the vehicle. Auxiliary brakes are primarily used in heavy-duty vehicles with the principal aim of saving the service brakes of the vehicle, especially when driving on long downhill slopes where there is a desire to brake to maintain a fairly constant speed. The use of the auxiliary brakes allows the service brakes to be kept fresh, so that they can provide maximum braking force when the vehicle really needs to slow down quickly. Usually, the service brakes have a much more powerful braking action than the auxiliary brakes, partially owing to the fact that the service brakes are normally arranged on all the wheels of the vehicle. The auxiliary brakes normally act only on the driving wheels.

There are two main types of auxiliary brakes used on heavy vehicles. An auxiliary brake located before the main gearbox is referred to as a primary auxiliary brake. The brake power which can be delivered by a primary auxiliary brake is dependent on the engine speed, and for this reason it is advantageous to maintain a relatively high engine speed whenever a primary auxiliary brake is used.

A secondary auxiliary brake type is located somewhere after the main gearbox of the vehicle. The brake power which can be delivered by a secondary auxiliary brake is dependent on the speed of the vehicle, since the auxiliary brake is mounted on the output shaft of the gearbox and is therefore proportional to the rotation speed of the drive wheels. In order to raise the efficiency of a secondary auxiliary brake, there may be a gear with a gear ratio that raises the rotation speed of the auxiliary brake.

One common auxiliary brake used on heavy vehicles is a retarder. A retarder is usually of the hydrodynamic retarder or the electromagnetic retarder type. Such a retarder may be a primary auxiliary brake or a secondary auxiliary brake.

When a retarder is used, the brake energy is converted into heat, and the generated heat must be dissipated in some way. In modern vehicles, the retarder is often a fluid-cooled hydraulic retarder. The hydraulic oil of the retarder is led through a heat-exchanger which in turn is connected to the radiator system of the vehicle. In this way, the retarder uses the same radiator and the same cooling system as the engine. This is advantageous in that parts and weight is saved on the vehicle. It is also possible to utilise a dedicated radiator for the retarder.

One advantage with a combined cooling system for the retarder and the engine is that when the engine is not producing a large amount of heat, e.g. when the vehicle is rolling downhill, the full capacity of the cooling system can be used to cool the retarder. This will enhance the performance of the retarder. In addition, a cooling fan is usually arranged in the cooling system, which cooling fan is governed by the cooling fluid thermostat. The cooling fan will thus start when the cooling fluid has reached a predefined temperature in order to force more air through the radiator and thereby increase the cooling capacity.

In some cases where the retarder is extensively used, however, it is a need for a large cooling capacity and/or a need for an immediately increase of the cooling capacity which cannot be provided by the prior art cooling systems. Such situations can arise for example when the vehicle is travelling down a slope having certain steepness and the retarder is used for a longer period.

It is desirable to provide an improved method for controlling cooling of an auxiliary brake arranged on a vehicle.

By the method according to the invention, comprising the steps of a) determining if the vehicle is travelling down a slope or is to be driven down a slope, and b) activating the cooling member automatically for cooling the auxiliary brake provided that at least one predefined downhill slope condition is determined, wherein said downhill slope condition comprises that the steepness of the slope is determined to be in a predefined interval, the cooling member such as a cooling fan can be activated immediately when it is anticipated that the auxiliary brake will be in use for a longer period. This implies that the delay time of the system is eliminated or at least decreased, i.e. the cooling system is able to cool the auxiliary brake before the brake has reached an undesired high temperature. In prior art systems where the cooling fan is activated based on the temperature of the coolant the additional cooling provided by the cooling fan is often added to late to allow an effective operation of the auxiliary brake. One advantageous consequence with the invention is that the time with high brake torque delivered by the auxiliary brake of the vehicle will be increased before the auxiliary brake will be degraded due to overheating.

By the invention it is possible to pre-cool the auxiliary brake and pre-load the cooling system such that the system is able to cool the auxiliary brake when the need of cooling the auxiliary brake is increased. If for example the cooling member is a cooling fan which is arranged to cool a coolant which in turn is used for cooling the auxiliary brake, the temperature of the coolant can be lowered before using the auxiliary brake. By lowering the coolant temperature before the vehicle is driven down a slope or immediately when the vehicle starts to travel down the slope, the time during which the retarder can deliver a maximal brake torque before the brake torque degrades due to overheating can be prolonged. In many cases the temperature of the coolant can be lowered to below 90° C., preferably to below 80, 75 or 70° C. dependent on the current need of cooling and the normal operation temperature of the coolant of the cooling system. A lowering of the coolant temperature with more than 5° C., and preferably with more than 10, 15 or 20° C., implies that the cooling capacity of the cooling system is increased and the system can absorb a larger amount of heat generated by the auxiliary brake.

By the expression "determining if the vehicle is travelling down a slope or is to be driven down a slope" is meant that a technical means preferably arranged on the vehicle, is used to create a parameter indicating a certain downhill slope condition of the road. The slope condition can be represented by a parameter value directly related to a slope, such as the steepness and length of a slope, and/or a parameter value indirectly related to a slope, such as a vehicle parameter which in turn indicates a slope or a feature of a slope. Such indirect vehicle parameter values are for example, indication that the auxiliary brake is used, the vehicle speed or (acceleration)/deceleration of the vehicle, an inclination of the vehicle etc. Furthermore, according to a preferred embodiment of the invention, GPS and/or an electronic map can be used for determination if the vehicle is to be driven down a slope or the steepness of a slope the vehicle is travelling down.

According to a preferred embodiment of the invention, it is determined if the vehicle is travelling down a slope by measuring the deceleration of the vehicle when the auxiliary brake is used. If the deceleration is below a predetermined value, and the auxiliary brake is activated it is assumed that the vehicle is travelling downhill and that a large amount of heat will be generated by the auxiliary brake. It is also possible to calculate the steepness of the slope based on the deceleration value and further vehicle parameters, such as brake force, mass etc. By activation of the cooling member the performance of the auxiliary brake is enhanced due to increased cooling capacity and at the same time the cooling member, such as a cooling fan can be activated only when necessary which in average reduces noise, wear and fuel consumption. In addition to the deceleration condition the speed of the vehicle can be used to determine if the cooling fan should be activated. If the vehicle travels with an almost constant speed (i.e. the deceleration condition is fulfilled) but a very low speed it may be unnecessary to start the cooling fan. Thus, in this embodiment of the invention the cooling member is activated only if both the deceleration condition is present and the speed of the vehicle is over a predetermined value.

In an advantageous further development of the method according to the invention, the cooling member is a cooling fan, and the cooling member is activated by raising the rotation speed of the cooling fan to a predetermined value. Raising the speed is here meant to comprise also the case when the cooling fan is started, i.e. when the speed is increased from zero to a predetermined value. By giving the cooling fan a rotation speed just below the maximum rotation speed of the cooling fan, preferably in the interval 50-95% of the maximum rotation speed and more preferably in the interval 70-90% of the maximum rotation speed, the auxiliary brake can often be effectively cooled, and at the same time noise generated by the fan can be reduced due to the fact that the maximum rotation speed of the cooling fan is avoided. By selection of a rotation speed adapted to the need of cooling, rather than always using the maximum rotation speed, the fuel consumption of the vehicle can be decreased. This is related to the transition period when the braking operation is over and the engine drives the vehicle again. The lower fan rotation speed the smaller energy loss during the transition period.

The steepness can also be measured by means of an inclination sensor, and/or calculated by means of an inclination algorithm or as mentioned above determined by using GPS and/or an electronic map, preferably a topographic map.

Using an inclination sensor arranged on the vehicle is a cost effective and safe way to identify or determine a slope. As soon as the slope is identified the auxiliary brake can be pre-cooled by activating the cooling member in the way as previously described hereinabove. Although such an inclination sensor can be used together with other information, it can also be used alone, i.e. without information about vehicle deceleration, to decide about activation of the cooling member.

In a further embodiment of the invention, an inclination determination algorithm is used to estimate the steepness of the slope the vehicle is travelling down. The inclination determination algorithm may use the speed of the vehicle, the load of the vehicle or vehicle combination and the applied brake torque to calculate an estimated slope value. This value is then used to predict the required cooling capacity for the cooling system and to determine if for example a cooling fan should be activated and to select a suitable rotation speed value for the cooling fan. By estimating the slope, the rotation speed of the cooling fan may be set more precisely.

BRIEF DESCRIPTION OF THE DRAWINGS

The invention will be described in greater detail below with reference to illustrative embodiments shown in the appended drawings, wherein.

DETAILED DESCRIPTION

Figure 1:
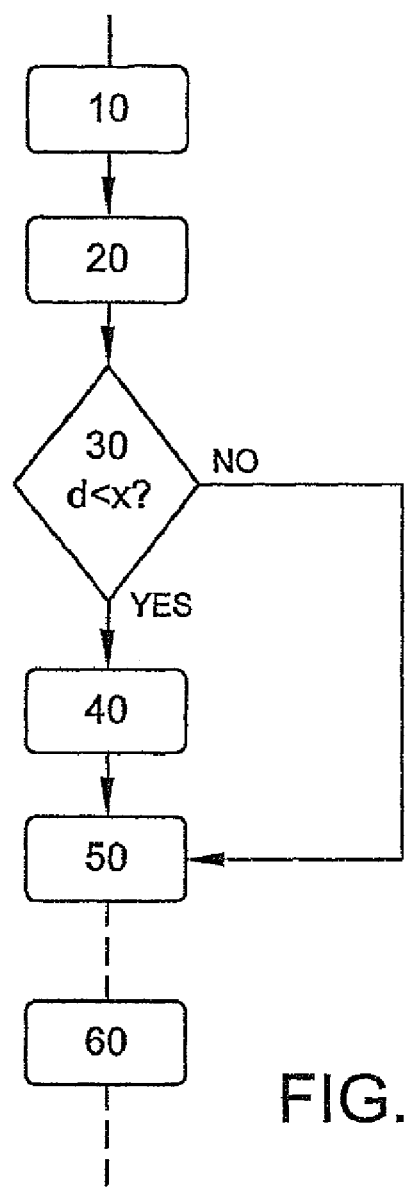
FIG. 1 shows a flow chart of one embodiment of the method according to the invention.

The following described illustrative embodiments of the invention, with further developments, should be regarded purely as examples and should in no way limit the protective scope of the patent claims. In the illustrative embodiments described below, a hydrodynamic retarder will be used as an example of an auxiliary brake. It should however be understood that the invention applies to all auxiliary brakes that are cooled by a cooling member, preferably where the cooling member is arranged to lower the temperature of a fluid, i.e. a coolant which in turn is used for cooling the auxiliary brake. In the following examples the cooling member is a cooling fan.

When a vehicle is driven on a downhill slope, there is a need to use brake power in order to maintain a constant speed for the vehicle. This speed should be low enough to be within the safety margins of the braking system of the vehicle, i.e. so that the vehicle can be braked to a standstill in a controlled and safe manner. Normally, a driver tries to make as much use as possible of the auxiliary brakes, especially during lengthy downhill gradients. A common driving strategy is to use the auxiliary brakes to maintain a regular vehicle speed and only to use the service brakes to reach this speed. Thus, the driver will use the available auxiliary brakes in order to maintain a steady and safe speed. Vehicles equipped with an auxiliary brake in the form of a hydraulic retarder have a large brake capacity and these vehicles can thus travel downhill with a relatively high speed.

However, a retarder will generate a large amount of heat. The heat is transferred by the hydraulic oil used in the retarder to a heat exchanger that transfers the heat to the cooling system of the vehicle. After a while, the cooling fluid of the cooling system has reached a predefined fluid temperature and the cooling fan is activated. Since the retarder continues to generate heat and the cooling system is a rather slow system, the heat capacity of the cooling system according to prior art will not always be sufficient. The control system of the retarder will thus reduce the brake torque of the retarder in order to reduce the generated heat. After a certain time, the cooling system has reached a steady state with a reduced brake torque. To compensate the lost brake torque of the retarder, the service brakes of the vehicle may be used. These may be engaged manually by the driver or automatically by the brake control system, e.g. when a brake cruise function is used.

When the vehicle is driven on a horizontal road and the driver wants to slow the vehicle down, he will use the brakes. The driver will apply the brakes manually and the vehicle will slow down. The brakes used may be the auxiliary brakes and/or the service brakes. Thus, when the brakes are applied, the vehicle will decelerate. In this case, the amount of heat generated by the auxiliary brake is relatively small which means that the cooling system can cool the retarder, since the normal ram air flow through the radiator together with the heat storage capacity in the coolant is enough to take care of the generated amount of heat. In this case, there is no need to start the cooling fan in order to raise the cooling capacity of the cooling system. This also applies for roads having a slight slope.

When the vehicle is driven on a road with a steeper downhill slope and the driver wants to maintain a constant speed, the retarder will be used. This may be done either automatically using a brake cruise function in which the control system of the vehicle maintains the speed at a constant level or the driver may select an appropriate retarder level manually in order to maintain a constant speed. In either case, the retarder is applied and the vehicle is not decelerating, or the deceleration is below a predefined value. This implies that the vehicle is travelling downhill and that an increased cooling capacity of the cooling system will soon be required in order to handle the heat generated by the retarder. The control system will in this case, in accordance with the invention, start the cooling fan immediately. This will temporarily lower the temperature of the cooling system and will also prepare the cooling system for the conning amount of heat, i.e. the system will be preloaded with cooling capacity.

In this example, an on/off fan is used. The fan is on when it is activated and off when it is deactivated. The fan may be mechanically driven by the engine of the vehicle and is activated in a known manner, or it may be an electrical fan activated by a relay.

The cooling fan can be of the type allowing the rotation speed of the cooling fan to be regulated continuously. In this case, the fan may be driven mechanically by the engine of the vehicle and comprises a viscous-elastic coupling that can be used to continuously control the rotation speed of the fan. The fan may also be an electrical fan or an engine driven viscous-electronic activated fan controlled by an electrical control unit, either continuously or in a number of discrete steps. By using a fan of this kind, the rotation speed of the cooling fan may be controlled in a more precise way. By doing this, it is possible to set the rotation speed of the cooling fan to a value that is estimated to be sufficient to handle the generated heat instead of using the maximal rotation speed value. In this case, a required cooling capacity for the generated heat may be estimated, e.g. with regard to ordered brake torque and outside temperature, and the requisite rotation speed of the cooling fan can then be set. This can reduce the noise generated by the fan and can also reduce the fuel consumption of the vehicle.

The value of the rotation speed can be chosen in different ways. One way is to estimate the amount of heat that will be generated by the retarder. This gives a value of the amount of heat that the cooling system must dissipate. The rotation speed of the fan is then set to a value that corresponds to the estimated requisite cooling capacity. Mostly, the amount of heat that will be generated is fairly large. Another possibility is thus to set the rotation of the cooling fan to a value somewhat lower than the maximal allowed rotation speed of the cooling fan. A value of around 80% or slightly more of the maximal allowed rotation value may be an acceptable figure. This reduces the noise generated by the fan but gives an acceptable cooling efficiency for most cases. It is also possible to always select the maximal allowed rotation speed in order to secure the optimum performance of the retarder. One purpose of the invention is to prolong the time during which the retarder can deliver a maximal brake torque before the brake torque degrades due to overheating.

The speed of the vehicle can also be used to determine if the cooling fan should be activated or not. When a speed signal is used, account is suitably taken to the type of retarder used. The efficiency of a primary retarder, i.e. a retarder disposed between the engine and the main gearbox, is depending on the rotation speed of the engine. Therefore, the retarder may deliver a high brake torque even when the vehicle is travelling at a low speed, e.g. when a very heavy vehicle is driving down a very steep slope. In this case, the retarder will generate a large amount of heat and the cooling fan should be activated.

This is also the case when an enhanced engine brake is used as an auxiliary brake, such as a Volvo Engine Brake (VEB), which is also a primary auxiliary brake. This auxiliary brake forms a compression brake wherein the timing of the exhaust valves is controlled in order to give a higher compression pressure during the brake phase of the engine. Some of the heat generated by the VEB is released through the exhaust gases, and some of the generated heat is transferred to the engine. The heat transferred to the engine will heat the cooling fluid. Thus, when a VEB is used as an auxiliary brake, it may be of advantage to start the cooling fan immediately in the same way. A VEB does not have an own separate cooling system, but the heat generated by the VEB is cooled by the cooling system of the vehicle.

The efficiency of a secondary retarder, i.e. a retarder placed after the main gearbox, is depending on the speed of the vehicle. Since the retarder is placed after the gearbox, the rotation speed of the propeller shaft driving the rear axle also drives the retarder. When the vehicle travels with a low speed, the propeller shaft will rotate slowly. In this case, there is no need to activate the cooling fan since the retarder will not generate a significant amount of heat.

FIG. 1 shows a schematic flow chart of one embodiment of the method according to the invention. In step 10, the retarder is activated. The activation of the retarder is ordered either by the driver by pressing the brake pedal or activating the retarder lever, or automatically by the system when using a brake cruise function. In order to let the retarder reach the requested brake torque, a delay time is applied in step 20. This is due to the fact that the response time for a retarder is rather slow compared to the service brakes, e.g. in the region of 1-2 seconds. The delay time is thus selected to correspond to the response time for the retarder.

In step 30, the deceleration d of the vehicle is determined. This is preferably done by using wheel speed information from wheel speed sensors of non driven wheels, since they will not be affected by wheel slip due to the auxiliary brakes. The deceleration is in this step compared with a predefined value x. If the deceleration is below the predefined value, i.e. d<x, or if there is no deceleration at all, a control unit decides that there will be an increased amount of heat generated by the retarder and will thus send an activation signal to the cooling fan in order to activate it immediately. In some cases the vehicle will accelerate while travelling downhill in spite of that the auxiliary brake is activated. In such a case, the cooling fan has to be activated correspondingly.

If the deceleration is above the predefined value, i.e. there is a substantial deceleration, there is no need to activate the cooling fan since the retarder will not generate a significant amount of heat. Instead, the system continues to step 50, where the normal control system for the cooling fan continues.

The cooling fan is activated in step 40. As described above, the activation of the cooling fan may be either an on/off activation if an on/off fan is used, or the activation may comprise a set value ordering a specific rotation speed if a fan with a controllable rotation speed is used. The set value for the rotation speed is estimated in a known manner.

In step 50, the method continues to the normal control system for the cooling fan. In the normal system, the thermostat will activate the cooling fan when the cooling fluid reaches a first predetermined temperature. When the cooling fluid is cooled down enough after the retarder has been disengaged, the cooling fan will consequently be deactivated.

In an optional step 60, the method may also deactivate the cooling fan. In step 60, the temperature of the cooling fluid is measured when the retarder is disengaged. If the temperature is below a predetermined second level, which may either be the same as the first predetermined temperature of the cooling fluid or a lower temperature level, it is decided that the enhanced cooling capacity of the cooling system was not required and the cooling fan is deactivated immediately. This may be the case if the retarder was only activated for a short time or if the deceleration value was close to the predetermined value. This step is entered when the retarder is disengaged.

If the retarder has been engaged for a longer time, the cooling fluid temperature will be above the predetermined second level, and the cooling fan will continue to be activated until the thermostat of the cooling system deactivates it. If the cooling fluid temperature is above the predetermined first level, the cooling system will also continue to work as normal.

Figure 2:
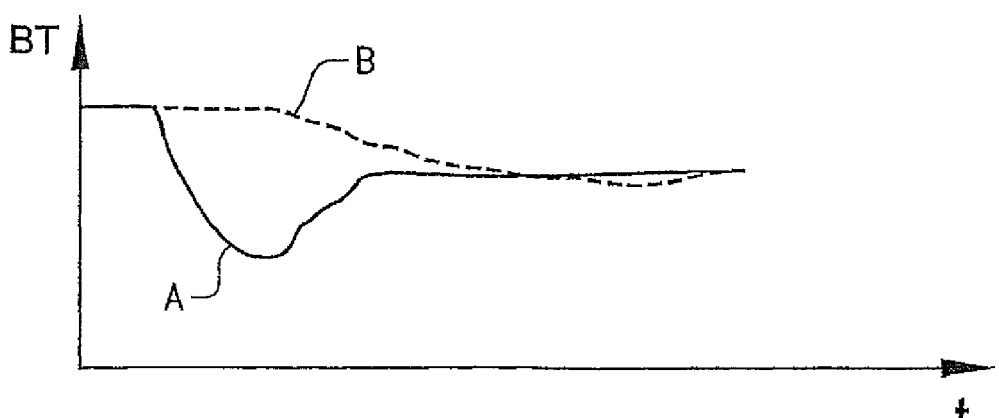
FIG. 2 shows a diagram of delivered brake torque versus time of an auxiliary brake.

FIG. 2 shows a graph of the brake torque BT delivered by a retarder for a vehicle travelling down a slope with and without the use of the method according to the invention.

Graph A shows the brake torque of a conventional retarder system, where the cooling fan is activated when the cooling fluid temperature has reach a predetermined value. A significant loss of brake torque can be seen before the cooling system reaches a steady state significantly below the maximum brake torque. For the vehicle to maintain a constant speed during the brake torque loss, the service brakes may be used. These may be applied by the driver or automatically by the system. This may lead to a loss of speed.

Graph B shows the brake torque of the vehicle using the method according to the invention. Since the cooling fan is activated before the retarder is activated or immediately when the retarder is activated, the cooling system will be able to handle the excessive heat generated by the retarder. As can be seen in the figure, the brake torque degrades slightly towards the steady state level, which is the same as for graph A.

The advantage is that the service brakes do not have to be used and a high brake torque can be used for a longer time. Since the service brakes do not have to be used to keep the constant speed of the vehicle, the safety margin is improved.

Figure 3:
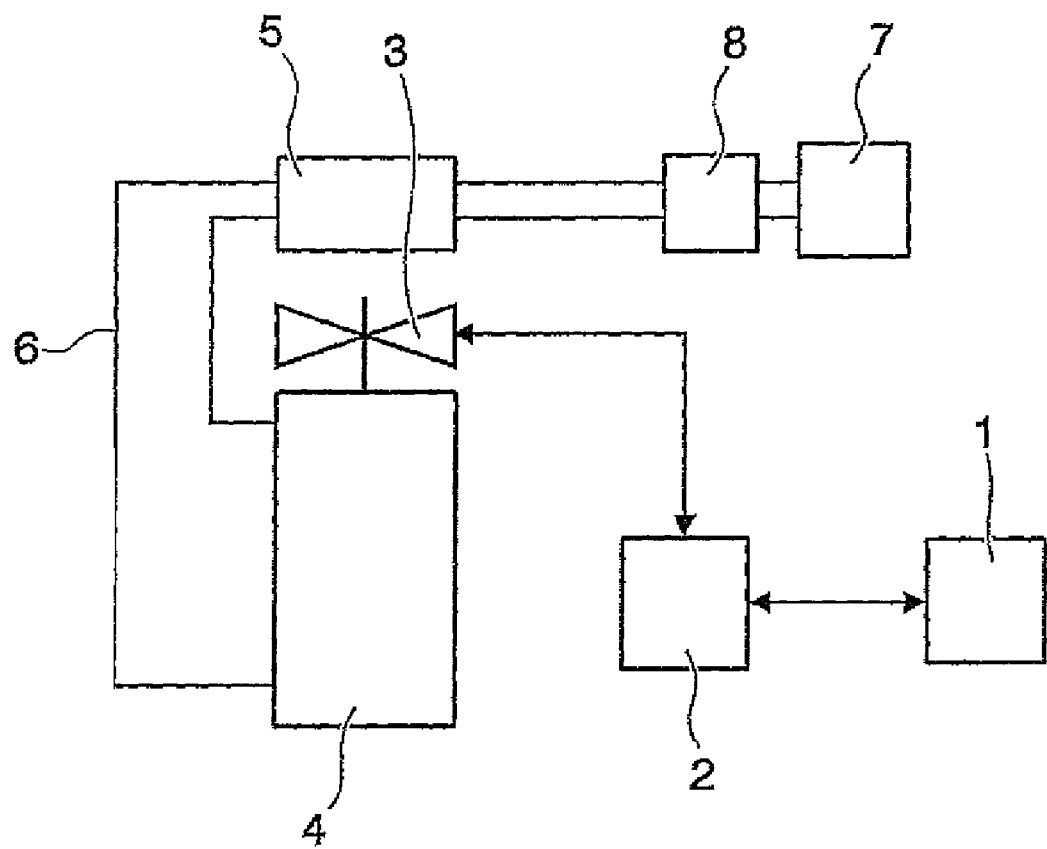
FIG. 3 shows schematically a device by which the method according to the invention can be accomplished.

In FIG. 3 a device for accomplishing the method according to the invention is schematically illustrated. The device comprises means 1 for determining if the vehicle is travelling down a slope or is to be driven down a slope. Such a means can be an inclination sensor, GPS, speed indicator or any suitable instrument for measuring the deceleration of the vehicle, etc. The slope indication means 1 can suitably create a parameter value indicating a certain slope condition which parameter is used by a control unit 2 for controlling the cooling member 3. In the illustrated embodiment the device is integrated in a system comprising an engine 4 provided with a radiator 5 and cooling circuit 6. The coolant, such as water, of the cooling circuit can be cooled by a cooling fan 3. An auxiliary brake 7, for example a hydraulic retarder, has a heat exchanger 8 which is connected to the radiator 5/cooling circuit 6. Thus, in this embodiment the cooling member is a cooling fan 3 which can be controlled by means of the control unit 2 based on information from the slope indication means 1. By lowering the temperature of the coolant the hydraulic retarder 7 can be cooled.

For accomplishment of the embodiment of the method described with reference to FIG. 2 the slope indicating means 1 is arranged to determine if the auxiliary brake 7 has been activated during a predetermined first time period, and to measure the deceleration of the vehicle when the auxiliary brake 7 has been activated during the predetermined first time period. The control unit 2 is then used for activating the cooling fan 3 of the cooling system when the deceleration is below a predefined value. The device has preferably such an electronic control unit 2, or uses an electronic control unit already comprised in the vehicle. In fact, the slope indicating means 1 could be integrated in or connected to an electric control unit already comprised in the vehicle. The electronic control unit 2 comprises inputs and outputs. Preferably, the electronic control unit is connected to and communicates with the electronic control system of the vehicle. This communication may be analogue or digital and preferable comprises data bus communication.

Through the communication with the control system of the vehicle, the control unit may receive information about for example when the auxiliary brake is activated, the deceleration of the vehicle, etc. Further signals may also be sent between the control unit and the control system of the vehicle.

The invention should not be deemed to be limited to the illustrative embodiments described above, but rather a number of further variants and modifications are conceivable within the scope of the following patent claims. For example, various different auxiliary brakes may be used alone or in combination.

The invention claimed is:

1. A method for controlling cooling of an auxiliary brake on a vehicle, wherein the auxiliary brake is cooled by a cooling member, comprising:
   a) determining if the vehicle is travelling down a slope or is to be driven down a slope, and
   b) activating the cooling member automatically for cooling the auxiliary brake provided that at least one predefined downhill slope condition is determined, the downhill slope condition comprising that the steepness of the slope is determined to be in a predefined interval.

2. A method according to claim 1, wherein the downhill slope condition comprises that the auxiliary brake is activated.

3. A method according to claim 1, wherein the downhill slope condition comprises that the deceleration of the vehicle is below a predefined value.

4. A method according to claim 1, wherein the downhill slope condition comprises that the speed of the vehicle is above a predefined value.

5. A method according to claim 1, comprising measuring the steepness of the slope by means of an inclination sensor.

6. A method according to claim 1, comprising calculating the steepness of the slope by means of an inclination algorithm.

7. A method according to claim 1, comprising determining the steepness of slope by means of a GPS and an electronic map.

8. A method according to claim 1, wherein the step of determining if the vehicle is travelling down a slope or is to be driven down a slope is accomplished by means of a GPS.

9. A method according to claim 1, wherein the cooling member is a cooling fan, the cooling member being activated by raising the rotation speed of the cooling fan to a predefined value.

10. A method according to claim 9, wherein the cooling fan has a maximum rotation speed and the rotation speed of the cooling fan is raised to a value between 50-95% of the maximum rotation speed of the cooling fan.

11. A method according to claim 9, wherein the cooling fan has a maximum rotation speed and the rotation speed of the cooling fan is raised to a value between 70-90% of the maximum rotation speed of the cooling fan.

12. A method according to claim 9, wherein the cooling fan has a maximum rotation speed and the rotation speed of the cooling fan is raised to a value which is at least 80% of the maximum rotation speed of the cooling fan.

13. A method according to claim 1, wherein the cooling member is arranged to cool a coolant which in turn is used for cooling the auxiliary brake, the cooling member being activated to lower the temperature of the coolant before using the auxiliary brake.

14. A method according to claim 13, wherein the temperature of the coolant is lowered to below 90° C.

15. A method according to claim 13, wherein the temperature of the coolant is lowered to below 80° C.

16. A method according to claim 13, wherein the temperature of the coolant is lowered to below 75° C.

17. A method according to claim 13, wherein the temperature of the coolant is lowered to below 70° C.

18. A method according to claim 13, wherein the temperature of the coolant is lowered more than 5° C.

19. A method according to claim 13, wherein the temperature of the coolant is lowered more than 10° C.

20. A method according to claim 13, wherein the temperature of the coolant is lowered more than 15° C.

21. A method according to claim 13, wherein the temperature of the coolant is lowered more than 20° C.

* * * * *